United States Patent
Anderson et al.

(10) Patent No.: US 10,461,685 B2
(45) Date of Patent: Oct. 29, 2019

(54) FOLDABLE PHOTOVOLTAIC ASSEMBLY WITH NON-PERPENDICULAR INTERCONNECTION

(71) Applicant: Global Solar Energy, Inc., Tucson, AZ (US)

(72) Inventors: Dale Huber Anderson, Tucson, AZ (US); Scot P. Albright, Tucson, AZ (US); Juan Gabriel Venegas, Tucson, AZ (US)

(73) Assignee: Global Solar Energy, Inc., Tucson, AZ (US)

( * ) Notice: Subject to any disclaimer, the term of this patent is extended or adjusted under 35 U.S.C. 154(b) by 32 days.

(21) Appl. No.: 15/285,321

(22) Filed: Oct. 4, 2016

(65) Prior Publication Data

US 2018/0097472 A1    Apr. 5, 2018

(51) Int. Cl.
*H02S 30/20*  (2014.01)
*H02S 40/36*  (2014.01)

(52) U.S. Cl.
CPC ............. *H02S 30/20* (2014.12); *H02S 40/36* (2014.12)

(58) Field of Classification Search
CPC .............................. H02S 30/20; H02S 40/36
USPC ........................................................ 136/245
See application file for complete search history.

(56) References Cited

U.S. PATENT DOCUMENTS

| | | | | |
|---|---|---|---|---|
| 3,459,391 A | * | 8/1969 | Haynos | B64G 1/222 244/172.7 |
| 4,574,160 A | * | 3/1986 | Cull | H01L 31/02008 136/244 |
| 8,389,862 B2 | * | 3/2013 | Arora | H05K 1/00 174/254 |
| 2008/0099062 A1 | | 5/2008 | Armstrong et al. | |
| 2008/0216887 A1 | * | 9/2008 | Hacke | H01L 31/022441 136/244 |
| 2008/0223429 A1 | | 9/2008 | Everett et al. | |
| 2009/0178703 A1 | | 7/2009 | Gumm | |
| 2010/0229923 A1 | * | 9/2010 | Frolov | H01L 31/0392 136/251 |

(Continued)

FOREIGN PATENT DOCUMENTS

WO    WO-2016002458 A1 *  1/2016  ............. H02S 30/20

OTHER PUBLICATIONS

Dec. 11, 2017, International Search Report of the International Searching Authority from the U.S. Receiving Office in PCT/US2017/054724, which is the international application to this U.S. application.

(Continued)

*Primary Examiner* — Allison Bourke
(74) *Attorney, Agent, or Firm* — Kolitch Romano LLP

(57) ABSTRACT

Foldable photovoltaic assemblies and methods of manufacturing such assemblies, including a transparent top sheet having a fold line and a conductive interconnection pattern spanning the fold line. The conductive interconnection pattern includes inter-cell connections configured to interconnect individual photovoltaic cells to form photovoltaic submodules, and also inter-submodule connections configured to interconnect photovoltaic submodules to form an assembly of submodules, which in some cases may be a fully assembled photovoltaic module. The inter-submodule connections span the fold line and are oriented at non-perpendicular angles relative to the fold line.

19 Claims, 3 Drawing Sheets

(56) References Cited

U.S. PATENT DOCUMENTS

| | | |
|---|---|---|
| 2010/0295383 A1 | 11/2010 | Cummings |
| 2013/0152996 A1 | 6/2013 | Degroot et al. |
| 2014/0238464 A1 | 8/2014 | Vesborg |
| 2015/0068582 A1* | 3/2015 | Chaney .................. B32B 37/06 136/245 |
| 2015/0083191 A1* | 3/2015 | Gmundner ............ H01L 31/048 136/245 |

OTHER PUBLICATIONS

Dec. 11, 2017, Written Opinion of the International Searching Authority from the U.S. Receiving Office in PCT/US2017/054724, which is the international application to this U.S. application.

* cited by examiner

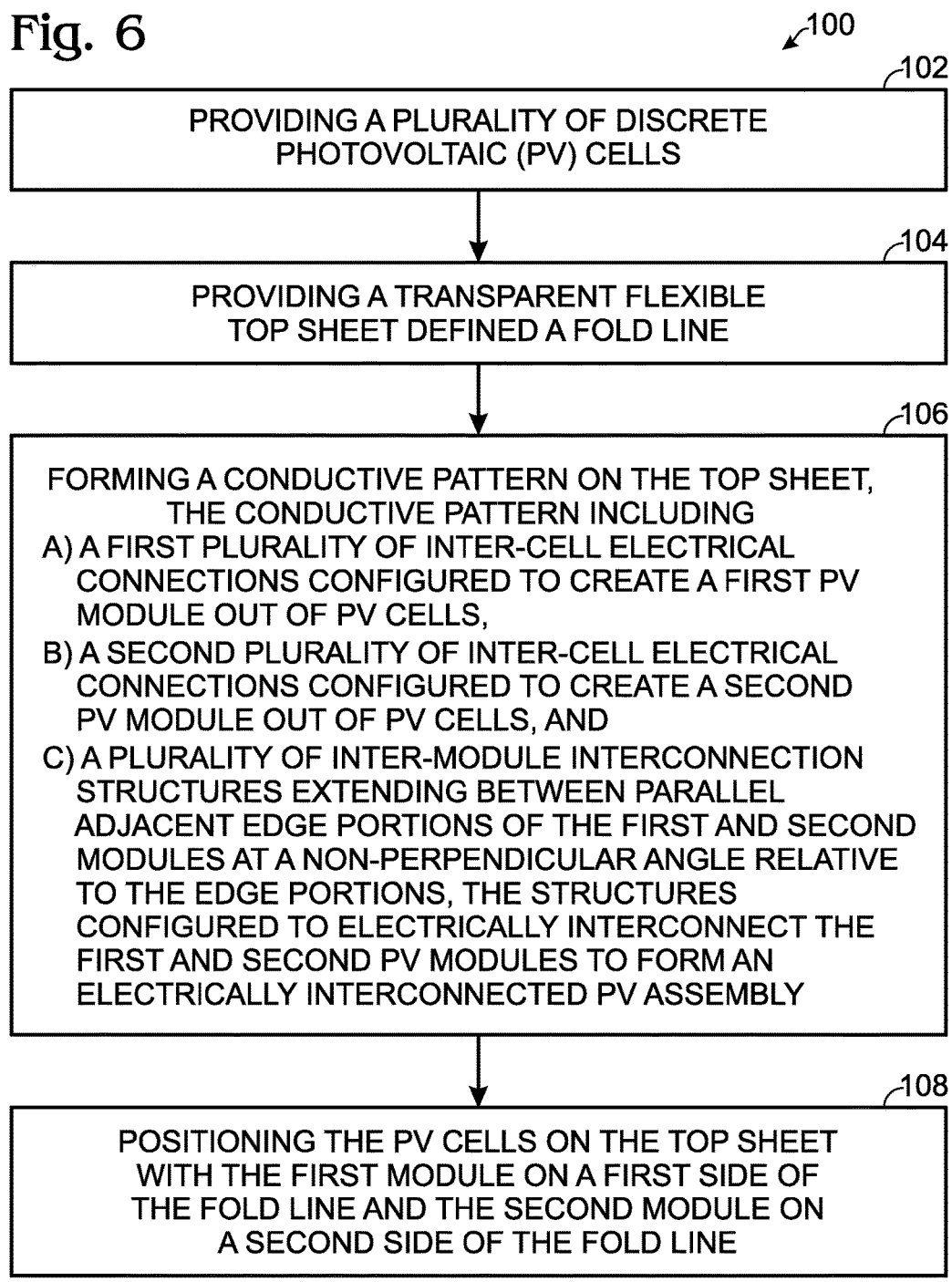

FOLDABLE PHOTOVOLTAIC ASSEMBLY WITH NON-PERPENDICULAR INTERCONNECTION

BRIEF DESCRIPTION OF THE DRAWINGS

FIG. 6 is a flow chart depicting a method of manufacturing a foldable assembly of photovoltaic submodules, according to aspects of the present teachings.

DETAILED DESCRIPTION

Overview

Figure 1:
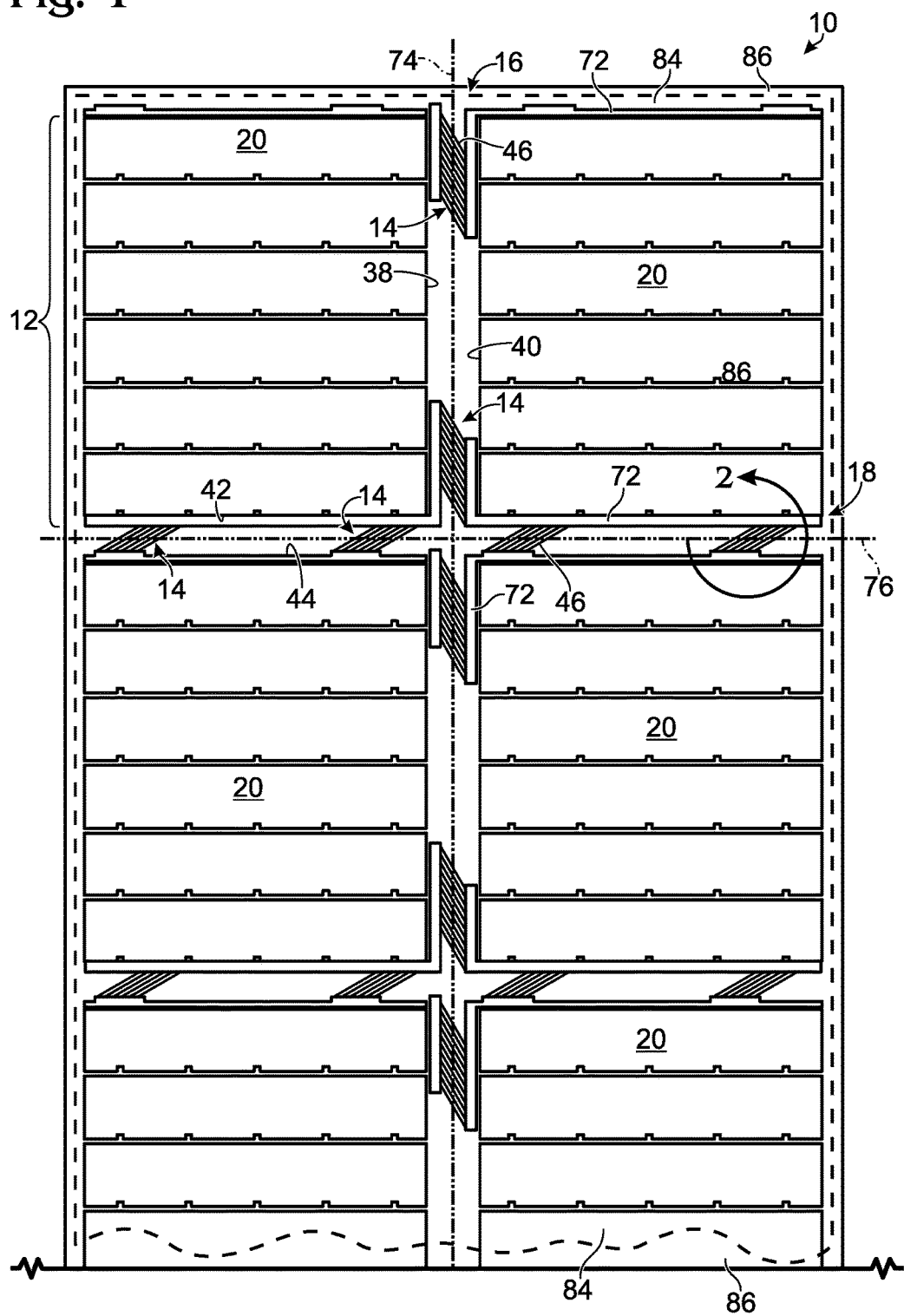
FIG. 1 is a top view showing an embodiment of a foldable assembly of electrically interconnected PV submodules, including a conductive interconnection structure located within fold zones between adjacent submodules, according to aspects of the present teachings.

Various embodiments of foldable PV assemblies are described below and illustrated in the associated drawings. The following description of various embodiments is merely exemplary in nature and is in no way intended to limit the disclosure, its application, or uses. Furthermore, each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Additionally, ordinal indicators, such as first or second, for identified elements are used to distinguish between the elements, and do not indicate a required or limited number of such elements, and do not indicate a particular position or order of such elements unless otherwise specifically stated.

The present teachings relate to foldable assemblies of electrically interconnected PV submodules, the assemblies being configured to be folded and unfolded along fold lines located within fold zones between adjacent pairs of the submodules, and including a non-perpendicular conductive interconnection structure within the fold zones. Foldability of PV assemblies may be particularly useful when storing and/or transporting the assemblies. For example, a foldable PV assembly may be suitable for use as a portable solar charger suitable for charging backup batteries, cell phones, laptop computers, mobile communications equipment, and/or the like, among others.

An exemplary foldable PV assembly may include a flexible substrate, two or more PV submodules disposed on the substrate and separated from each other by one or more fold zones, a fold line within each fold zone and along which the assembly may be folded and unfolded, and a conductive interconnection structure spanning each fold zone to interconnect adjacent pairs of the submodules. According to aspects of the present teachings, each interconnection structure includes one or more conductors extending through the fold zone at a non-perpendicular angle relative to the fold line to thereby electrically interconnect the submodules. The conductive interconnection structure may be referred to as a "non-perpendicular" interconnection structure due to the conductors extending through the fold zone at a non-perpendicular angle relative to the fold line. As described in more detail below, a non-perpendicular interconnection structure may enable the assembly to be folded and unfolded up to thousands of times, while causing minimum fatigue of the interconnect, thereby increasing the lifespan of the assembly relative to assemblies using perpendicular interconnection structures.

Section 1 below describes general features of foldable PV assemblies having non-perpendicular conductive interconnection structures, and Section 2 below describes specific features of non-perpendicular conductive interconnection structures.

1. General Features

FIG. 1 is a top view showing a foldable assembly, generally indicated at 10, of electrically interconnected PV submodules 12. Assembly 10 includes a plurality of non-perpendicular conductive interconnection structures 14 respectively located within first and second fold zones 16 and 18 between adjacent submodules 12. Assembly 10 is foldable in that assembly 10 may be configured to be transformed between an unfolded state (shown in FIG. 1) and a folded state (not shown), by folding and unfolding assembly 10 along fold lines 74 and 76 within fold zones 16 and 18. It should be apparent that there may also be additional fold zones, and associated fold lines, located between all adjacent submodules.

Generally, assembly 10 may be used in the unfolded state to collect solar radiation, and in the folded state to be stored and/or transported. However, assembly 10 may be used in any suitable way. For example, in some cases assembly 10 may be used in a folded or partially folded state to collect solar radiation, if fully exposing all of the PV submodules is not necessary or possible. In this case, bypass diodes can be used to allow electric current to bypass cells not exposed to solar radiation. Furthermore, assembly 10 may be transported or stored in an unfolded state, for instance to reduce the thickness of a stack of similar assemblies. Foldability and selected folded, unfolded, and partially folded configurations of assembly 10 are discussed in more detail below.

Assembly 10 is shown having six PV submodules 12 (with two shown only partially), each submodule having a plurality of electrically interconnected PV cells 20. More generally, according to the present teachings, foldable assemblies of PV submodules may include any suitable number of PV submodules each having any suitable number of PV cells. Additionally, the cells of each submodule may be configured in any suitable way, such as in rows, columns, or two-dimensional arrays. Additionally, although FIG. 1 shows assembly 10 and submodules 12 both as generally rectangular in shape, according to the present teachings, PV assemblies and submodules may have any suitable shape, such as but not limited to square, circular, oblong, triangular, polygonal, etc.

The present teachings may be applied to any suitable type(s) of submodules 12. In some embodiments, submodules 12 may be flexible "thin-film" PV submodules, and include a plurality of thin layers deposited on a flexible conductive substrate (not shown). Such layers may include but are not limited to one or more transparent upper layer(s), an electrically conductive collection grid, and one or more underlying electricity-producing semiconductor layer(s). For example, the transparent upper layer(s) may include an antireflective coating, a transparent adhesive, a cover glass, a submodule encapsulant, and/or any other suitable upper layer(s).

An upper submodule layer may also include a conductive collection grid disposed on a submodule-facing surface of the upper layer. In some embodiments, the collection grid may include substantially parallel strips of metallic conductors, such as copper (Cu) conductors. However, the collection grid may additionally or alternatively include conductors of any other suitable material(s) or mixture of materials, such as but not limited to nickel (Ni), silver (Ag), and the like. Additionally, the collection grid may be configured in any suitable pattern. In some cases, this may include a pattern that overlaps adjacent cells to facilitate their electrical interconnection with each other to form submodule 12, for instance by making electrical contact with one polarity of a first cell and the opposite polarity of an adjacent cell. In other cases, adjacent cells may be interconnected by other methods such as conductive wires or traces. The collection grid may be applied to the upper submodule layer in various ways. For example, the grid may be printed, electrodeposited, or left in place after surrounding portions of a conductive sheet are etched away.

In some embodiments, the underlying semiconductor layer(s) may include a photoactive composition including multiple semiconductor layers deposited on a conductive substrate. For example, the semiconductor layer(s) may include a p-type semiconductor absorber layer overlying an n-type semiconductor buffer layer to form a p-n junction. Any suitable semiconductor material(s) may be used, including but not limited to copper indium gallium diselenide (CIGS), cadmium sulfide (CdS), cadmium telluride (CdTe), gallium arsenide (GaAs), and/or amorphous silicon (a-Si). Additionally, the conductive substrate may be formed of any suitable material(s), such as stainless steel and/or molybdenum (Mo). The present teachings may be applied to PV submodules in which the cells have any desired structure and are interconnected within each submodule by any desired method.

As shown in FIG. 1, submodules 12 are separated from each other by fold zones such as fold zones 16 and 18. Each pair of adjacent submodules may be configured to have substantially parallel edge portions disposed on opposing sides of one of the fold zones, such as edge portions 38, 40, 42 and 44 of respective pairs of adjacent submodules. Edge portions of adjacent submodules 12 may be electrically interconnected by conductive interconnection structures 14. In the embodiment of FIG. 1, each interconnection structure 14 includes a plurality of conductors 46 (seen most clearly in FIG. 2) extending through one of fold zones 16 and 18 to thereby electrically interconnect edge portions of adjacent pairs of submodules 12.

In some cases, more than one interconnection structure 14 may be used to interconnect a pair of adjacent submodules. For example, in the embodiment of FIG. 1, two interconnection structures are used to interconnect each pair of adjacent submodules. More generally, any number of interconnection structures may be provided between adjacent submodules. Furthermore, in some embodiments, a submodule may be connected to more than one adjacent submodule. For example, in the embodiment of FIG. 1, which includes a 3×2 grid of submodules, each submodule is interconnected with at least two adjacent submodules. In other cases, such as in the case of a 4×1 configuration of submodules (or more generally, an n×1 configuration), some submodules might be interconnected with only one adjacent submodule. In still other cases of larger submodule arrays, some submodules might be interconnected with as many as four adjacent submodules, or even more in cases of non-rectangular submodule arrays.

In some cases, one or more of interconnection structures 14 (including associated conductors 46) may be cut, removed, or otherwise rendered electrically inactive in a final working assembly of interconnected submodules, to attain a particular electrical connection such as a parallel or series connection between submodules. For example, in the assembly of FIG. 1, cutting or removing conductors 46 that extend across fold line 74 would result in a series electrical connection between the submodules to the left of fold line 74, and also a series electrical connection between the submodules to the right of fold line 74. On the other hand, cutting or removing conductors 46 that extend across fold line 76 would result in a parallel electrical connection between the two submodules above fold line 76, and also a parallel electrical connection between the two submodules below fold line 76. The various groupings of connected submodules may be interconnected to each other (not shown) at edge portions of the assembly, or in any other desired location or manner.

Figure 2:
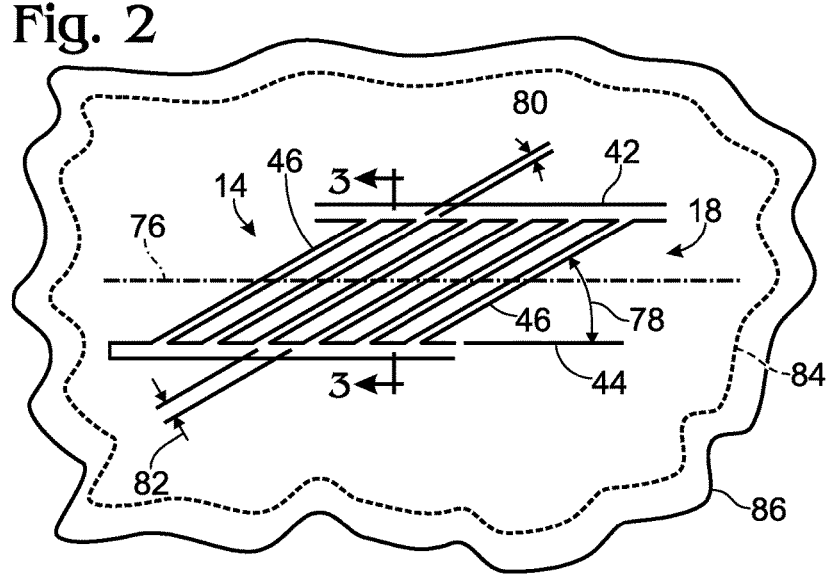
FIG. 2 is a magnified view showing a portion of the conductive interconnection structure of FIG. 1, including a plurality of conductors extending through a fold zone at a non-perpendicular angle relative to a fold line within the fold zone, according to aspects of the present teachings.

As shown in FIG. 1 and also in the magnified view of FIG. 2, in some embodiments, conductors 46 within each interconnection structure 14 may be linear and oriented substantially parallel to each other. However, other embodiments may include non-linear conductors 46 and/or conductors 46 that are not oriented substantially parallel to each other. Furthermore, the precise number of conductors provided in each interconnection structure may be varied, and in some cases an interconnection structure might include only a single conductor rather than a plurality.

Conductors 46 may be constructed from any suitable electrically conductive material and configured in any suitable manner. For example, conductors 46 may be thin strips of copper foil. Additionally or alternatively, conductors 46 may be braided, stranded, and/or flattened copper wires, electrodeposited copper traces, or copper traces remaining after etching away surrounding portions of a copper sheet.

In some embodiments, conductors 46 may be printed or electrodeposited conductors. Printed or electrodeposited conductors may be particularly useful in embodiments wherein submodules 12 are thin-film PV submodules. More specifically, in cases where thin-film PV submodules are formed by interconnecting adjacent cells with an interconnection pattern deposited on a transparent top sheet overlying the cells, one or more portions of the interconnection pattern may be extended through fold zones 16 and 18 to electrically interconnect pairs of adjacent submodules 12. In this manner, conductors 46 of interconnection structure 14 may be substantially contiguous with the interconnection pattern(s) used to interconnect the individual PV cells of the submodules forming the foldable assembly.

In other words, the present teachings contemplate that in some cases, a transparent top sheet for an assembly of PV submodules may be provided with a conductive pattern that serves both to interconnect the cells within each submodule, and also to interconnect adjacent submodules to each other. Thus, by correctly positioning and affixing the cells on the top sheet, complete interconnection of the PV assembly can be achieved with just a single interconnection pattern. This may streamline the manufacturing of the assembly by reducing or eliminating the need to place individual conductors in their proper position, as well as the need to solder or use other manual and/or mechanical means to complete the electrical interconnection between cells and between submodules.

On the other hand, some embodiments according to the present teachings may include conductors extending across a fold zone that are not extensions of the conductive interconnection patterns that connect the cells within submodules. For example, in some embodiments, conductors 46 may be braided and/or stranded copper wires that have been appropriately positioned between adjacent submodules 12 and soldered, welded (by heat and/or laser welding), connected with electrically conductive adhesive, or otherwise attached to edge portions of the submodules to complete the electrical interconnection between pairs of adjacent submodules. Some embodiments may include some number of printed conductors extending across a fold zone and included in the interconnection pattern that interconnects the cells within one or more individual submodules, as well as one or more conductors extending across a fold zone and which are not extensions of the submodule interconnection pattern.

In the embodiment of FIG. 1, conductors 46 may be folded and unfolded within their respective fold zones 16 or 18 when assembly 10 is transformed between a folded state and an unfolded state. In other embodiments, conductors serving the same general function as conductors 46 may be pivoted rather than folded within their respective fold zones 16 or 18. In such embodiments, the conductors may be copper wires that are run through pivot hinges (not pictured) so that the conductors may be pivoted rather than folded and unfolded when the foldable assembly is transformed between a folded state and an unfolded state.

More specifically, conductors extending across the fold zones may have a pivot hinge disposed in a central portion of the conductor, so that the two sides of the conductor meet at the pivot hinge. Accordingly, when assembly 10 is transformed from an unfolded state to a folded state, the conductors themselves may remain unfolded. Instead, the portions of the conductors on the two sides of the fold line may pivot, or twist, with respect to each other at the pivot hinge(s) so that the assembly may be folded without causing the conductors spanning the fold zone to fold. Conductors that are pivoted may be subjected to less internal stress than conductors that are folded, thereby increasing the lifespan of the foldable PV assembly. However, adding pivots may increase time, complexity, and costs of manufacturing the assembly.

Additionally, some embodiments may include conductive bus bars 72 disposed along edge portions of each submodule 12 and electrically connected to respective conductors 46. Bus bars 72 may be configured to conduct a current of electricity and facilitate the flow of electrical current through conductors 46 between pairs of adjacent submodules 12. The electrical current can be conducted in either direction through conductors 46, to allow flexibility in how PV assemblies according to the present teachings can be used. Bus bars 72 may be metallic bars, rods, wires, and/or strips of any suitable material(s), such as but not limited to copper, brass, and/or aluminum, among others. The bus bars may be electrically connected to conductors 46 in any suitable way, such as by bolting, clamping, soldering, welding, printing, etc. In some cases, the bus bars may be provided as part of an overall interconnection pattern disposed on a transparent top sheet layer of the assembly, as described previously with respect to conductors 46.

In some embodiments, submodules 12 and/or interconnection structures 14 may be disposed on a flexible substrate, such as substrate 84 depicted schematically in FIG. 1. The flexible substrate may, for example, define a rectangular grid including a plurality of submodule areas separated by fold zones such as fold zones 16 and 18. Each submodule may be disposed on the flexible substrate in one of the submodule areas, and each conductor 46 of interconnection structures 14 may extend through one the respective fold zones, over the flexible substrate, to electrically interconnect parallel edge portions of a pair of adjacent submodules 12. Submodules 12 may be disposed on the flexible substrate in any suitable positions, and may be adhered, laminated or otherwise attached to the flexible substrate.

The flexible substrate may be constructed from any suitable material or mixture of materials, including but not limited to plastic polymer(s), natural and/or synthetic textile(s), and/or the like. In some embodiments, the flexible substrate may include multiple layers, including a protective layer for the back (or non-radiation incident) side of assembly 10. For example, assembly 10 may be folded along its fold lines so that a protective back side layer, rather than submodules 12 and interconnection structures 14, is exposed, thereby protecting submodules 12 and interconnection structures 14 from external elements such as dust, scratches, liquids, etc. when the assembly is in a folded configuration. Accordingly, substrate 84 may be constructed from a weatherproof and/or UV resistant material.

In some embodiments, one or more flexible, transparent materials may be disposed over interconnection structure 14 and/or perimeter portions of submodules 12. For example, FIG. 1 depicts an upper transparent layer 86 overlying submodules 12 and substrate 84 at edge portions of the assembly. This upper transparent layer may be used to cover and protect a front side of assembly 10, including interconnection structures 14. In other words, submodules 12 and the elements used to interconnect them may be sandwiched between two layers—a flexible bottom substrate and a flexible, transparent upper material layer—thereby protecting the inner portions of the assembly from external elements.

In some embodiments, the transparent upper protective layer may be contiguous or partially contiguous with the underlying flexible substrate. For example, the flexible substrate and/or the upper protective layer may include excess material(s) around an outer perimeter portion of the plurality of submodules 12 (as opposed to around each individual submodule 12) that is folded over the perimeter portion of the assembly, to cover and protect the peripheral edges of submodules 12. The folded portion may be laminated, heat welded, adhered, or otherwise fixed in place relative to submodules 12. In other embodiments, however, the transparent upper protective layer may be noncontiguous with the underlying flexible substrate. For instance, the upper protective layer may be a completely separate layer having substantially the same dimensions as the substrate. In some embodiments, various other additional protective layers may be applied to assembly 10 and configured to protect submodules 12 from dust, scratches, liquids, etc.

Fold zones, such as fold zones 16 and 18 of assembly 10, may be characterized by fold lines, such as fold lines 74 and 76, each fold line defining a specific area of the associated fold zone along which assembly 10 may be folded and unfolded. For example, first fold zone 16 may be characterized by first fold line 74, and second fold zone 18 may be characterized by second fold line 76. Additionally, each fold line may run substantially parallel to a longitudinal axis defined by a length of its corresponding fold zone. For example, as shown in FIG. 1, fold line 74 may run substantially parallel to a longitudinal axis defined by a length of fold zone 16, and fold line 76 may run substantially parallel to a longitudinal axis defined by a length of fold zone 18.

As shown in FIG. 1, conductors 46 of interconnection structures 14 may extend through their respective fold zones at a non-perpendicular angle relative to a corresponding fold line. Extending the connecting conductors 46 through fold zones at a non-perpendicular angle may reduce internal stress of conductors 46 from repeated folding and unfolding, as compared to extending through fold zones at a perpendicular angle. The non-perpendicular angle characterizing interconnection structures 14 is discussed in more detail in Section 2 below.

Assembly 10 may be configured to be folded and unfolded along its fold lines to thereby transform assembly 10 between a folded state (not shown) and an unfolded state (shown in FIG. 1). In the folded state, as few as one or even none of submodules 12 may be exposed, depending on how assembly 10 is folded. In the unfolded state, all submodules 12 of assembly 10 may be exposed. Generally, the unfolded state may be most appropriate for collecting solar radiation for purposes of maximizing the amount of solar radiation that can be collected, thereby maximizing the amount of electricity that can be produced. On the other hand, the folded state may facilitate storage and transport of the assembly. Assembly 10 may be configured to be folded and unfolded along its fold lines in any suitable manner and order of folding operations, e.g., by first folding along fold line 74 and then folding along fold line 76, or vice versa.

Additionally or alternatively, assembly 10 may be configured to be transformed from the unfolded or folded state to an intermediate (or partially folded) state. This may be accomplished by folding assembly 10 in a manner that leaves a subset of submodules 12 exposed, so that the assembly can collect some amount of solar radiation less than the maximum possible amount when all submodules are exposed. This may be desirable, for example, in situations where sunlight only reaches a small area, or when only a relatively small amount of electricity generation is needed. Assemblies configured for partial exposure in this manner will typically include bypass diodes or some other mechanism for the generated electrical current to bypass the unexposed PV submodules.

Photovoltaic assemblies according to the present teachings may include any suitable number and/or configuration of fold lines. For example, PV assemblies according to the present teachings may include six, eight, or 12 submodules aligned in one row, i.e., a one-by-n submodule configuration, with parallel fold lines located between each pair of adjacent submodules. In other cases, assembly 10 may be folded in a zig-zag or accordion-like configuration. Regardless of how the assembly is configured to be folded, non-perpendicular conductive interconnection structures between submodules of the assembly may enable repeated folding and unfolding of the assembly while minimizing fatigue of the interconnection structures. Interconnection structures according to the present teachings are discussed in more detail in Section 2 below.

2. Non-Perpendicular Conductive Interconnection Structures

FIG. 2 is a magnified view showing a portion of an exemplary one of non-perpendicular conductive interconnection structures 14 of FIG. 1, including a plurality of conductors 46 extending through fold zone 18 at a non-perpendicular angle 78 relative to fold line 76, according to aspects of the present teachings. More specifically, FIG. 2 shows one of any of the laterally spaced groups of conductors 46 located within fold zone 18.

As depicted in FIG. 2, each conductor 46 extends through fold zone 18 at a non-perpendicular angle 78 relative to fold line 76, to electrically interconnect parallel edge portions 42, 44 of adjacent PV submodules 12. Conductors 46 may extend through fold zone 18 at any suitable non-perpendicular angle relative to fold line 76. For example, as shown in FIG. 2, angle 78 may be approximately 30 degrees. More generally, however, angle 78 may be between approximately 10 and approximately 45 degrees. Additionally, as shown in FIG. 2, conductors 46 may be linear and parallel in fold zone 18, so that adjacent conductors 46 extend through fold zone 18 at the same non-perpendicular angle 78. However, other embodiments may include non-linear and/or non-parallel conductors 46 extending through fold zone 18 at different non-perpendicular angles.

Conductors 46 may have a common width 80 and be separated from each other by a common separation distance 82, measured orthogonally between parallel conductors. In some cases, separation distance 82 may be at least twice the width 80. For example, each conductor 46 may have a width 80 of approximately 1.0 mm, and the separation distance 82 between conductors may be approximately 2.0 mm. In general, it may be preferable for separation distance 82 to be greater than width 80 so that more bending occurs in the spaces between conductors 46 than in conductors 46 when assembly 10 is folded and unfolded along fold line 76. However, various embodiments may include any suitable width 80 and separation distance 82. Additionally, some embodiments may include conductors 46 having different widths and/or different separation distances between conductors.

Figure 3:
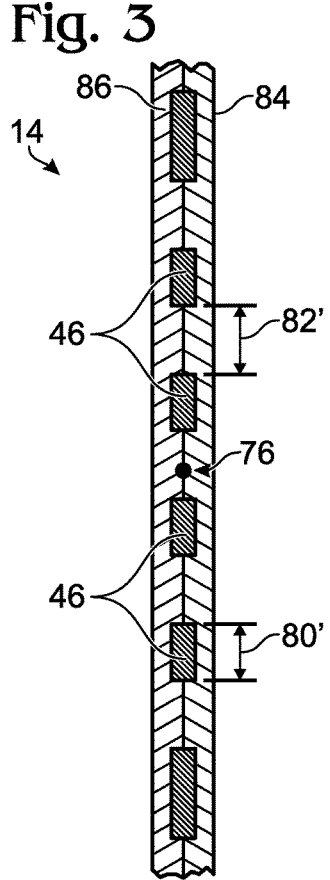
FIG. 3 is a sectional view of the conductive interconnection structure of FIG. 2, taken along the line 3-3 in FIG. 2.

FIG. 3 is a sectional view taken along the line 3-3 in FIG. 2. The sectional view of FIG. 3 shows that each conductor 46 has a width 80' measured in a direction orthogonal to the fold line, and similarly that the conductors are separated by a separation distance 82' measured in a direction orthogonal to the fold line. These quantities are related by the cosine of the non-perpendicular angle 78, i.e. $80=80' \cos \theta$, $82=82' \cos \theta$, where $\theta$ is angle 78 indicated in FIG. 2. FIG. 3 also suggests that folding may occur along fold line 76 in the space between conductors 46 rather than in conductors 46 themselves, thereby minimizing the fatigue of conductors 46 caused by the folding and unfolding of assembly 10. This principle is illustrated further in FIGS. 4-5 and described in more detail below.

Figure 4:
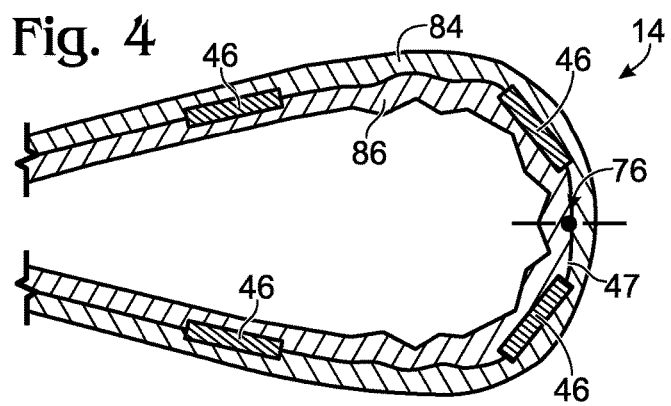
FIG. 4 is a magnified sectional view showing a portion of a fold zone of a folded assembly of electrically interconnected PV submodules, including a conductive interconnection structure located within the fold zone, according to aspects of the present teachings.
Figure 5:
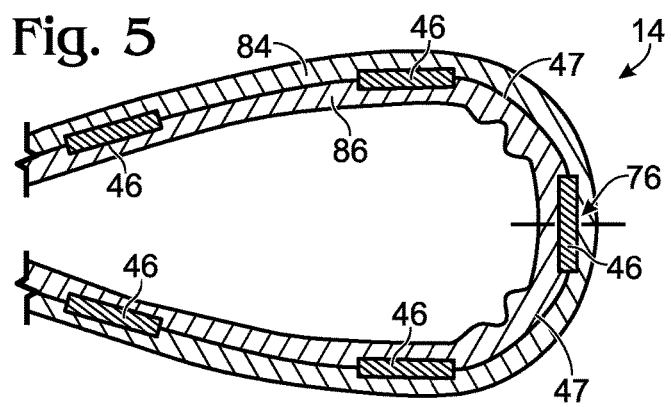
FIG. 5 is a magnified sectional view showing another portion of the fold zone depicted in FIG. 4.

FIGS. 4-5 are magnified sectional views showing interconnection structure 14 of FIGS. 2-3 in a folded configuration, and also depicting flexible substrate 84 and protective layer 86. Interconnection structure 14 is sandwiched between flexible substrate 84 and flexible material 86, which both may be configured to protect interconnection structure 14 from external elements. In both FIG. 4 and FIG. 5, interconnection structure 14 is folded so that parallel edge portions 42, 44 of adjacent submodules are proximate to each other, i.e. so that one submodule overlays the adjacent submodule.

In FIG. 4, a majority of the bending that occurs within the fold zone occurs in a space 47 between conductors 46 rather than in conductors 46 themselves. This is due to the non-perpendicular angle of the conductors relative to the fold line, which allows portions of the fold line to intersect interconnection structure 14 at the empty spaces between the conductors. It should be apparent from FIGS. 2-4 that the greater the separation distance between conductors relative to the width of each conductor, the smaller the fraction of the fold line is that will intersect a conductor.

Of course, at some locations the fold line must necessarily intersect with a conductor 46. In this case, as shown in FIG. 5, the greater stiffness of the conductor relative to the empty space between conductors causes the majority of the bending to occur in the spaces 47 between conductors 46, again limiting the fatigue of the conductors. In contrast, if the interconnecting conductors were orthogonal to the fold line as in other interconnected assemblies, bending would be forced to occur within the conductors, resulting in greater fatigue and a correspondingly reduced lifespan of the interconnected assembly.

More specifically, tests have shown that assembly 10 may be folded and unfolded up to 2500 cycles or more before fatigue of conductors 46 results in a fracture, whereas in assemblies where the interconnecting conductors are perpendicular to the fold line, fractures begin to appear after about 500 folding cycles. In other words, the non-perpendicular interconnection structure configurations of the present teachings can extend the lifespan of the interconnection structure by a factor of five or more.

3. Methods of Manufacture and Assembly

The present teachings contemplate that the conductive interconnection structure between submodules of a foldable PV assembly may be provided on a transparent top sheet that also includes conductive patterns used to interconnect cells within each submodule of the assembly. Thus, as mentioned previously, by correctly positioning and affixing the cells on the top sheet, complete interconnection of the PV assembly can be achieved with just a single interconnection pattern. This may streamline the manufacturing of the assembly by reducing or eliminating the need to place individual conductors in their proper position, as well as the need to solder or use other manual and/or mechanical means to complete the electrical interconnection between cells and between submodules. This section describes exemplary methods of manufacture and assembly that utilize these efficiencies; see FIG. 6.

FIG. 6 depicts multiple steps of a method, generally indicated at 100, for manufacturing an electrically interconnected assembly of PV submodules. Method 100 may be used to manufacture and/or assemble any of the assemblies, foldable PV chargers, or foldable PV assemblies depicted in and described in reference to FIGS. 1-5. Although various steps of method 100 are described below and depicted in FIG. 6, the steps need not necessarily all be performed, and in some cases may be performed in a different order than the order shown in FIG. 6 and described below.

Method 100 may include a step 102 of providing a plurality of discrete, electrically separated photovoltaic cells. Each of the plurality of PV cells is configured to transform solar energy into electrical energy. Each of the plurality of PV cells includes a first side having a first electrical polarity and a second side having a second electrical polarity, where the second polarity is opposite the first polarity. Each of the plurality of PV cells may be mounted on a respective substrate, back sheet, or some other appropriate support member or members.

Method 100 may include a step 104 of providing a transparent flexible top sheet defining a fold line. The top sheet may form a layer, such as a top layer, of the assembly of PV submodules. When the PV assembly is in operation, the top sheet may be disposed between the plurality of PV cells and the incident radiation or sunlight. A transparent top sheet may facilitate solar energy passing through the top sheet to the underlying PV cells. The top sheet may be flexible to facilitate folding of the assembly of PV submodules, among other advantages. Folding of the assembly may be configured to take place along one or more fold lines.

Method 100 may include a step 106 of forming a conductive pattern on the transparent flexible top sheet. The conductive pattern may be formed on the top sheet through any appropriate process. For example, the conductive pattern may be formed in a process including electrodeposition of the conductive pattern onto a patterned cylinder, rotating the cylinder until the conductive pattern comes into contact with the top sheet, and separating the top sheet from the cylinder with the conductive pattern attached to the top sheet. Alternatively, the conductive pattern may be formed through a subtractive process, wherein a layer of conductive material is formed on the top sheet and then selectively removed to leave the desired pattern.

The conductive pattern may include a first plurality of inter-cell electrical connections configured to electrically interconnect a first subset of the PV cells to create a first electrically interconnected PV submodule, and a second plurality of inter-cell electrical connections configured to electrically interconnect a second subset of the PV cells to create a second electrically interconnected PV submodule. For example, each of the inter-cell electrical connections may include a bus bar and a plurality of tabs extending from the bus bar. The bus bar may be configured to make electrical contact with the first polarity of a PV cell and the electrical tabs may be configured to make electrical contact with the second polarity of an adjacent PV cell in a PV submodule. Thus may adjacent PV cells be connected in series within a PV submodule.

The conductive pattern also may include a plurality of inter-submodule interconnection structures, each extending between parallel adjacent edge portions of the first and second submodules at a non-perpendicular angle relative to the edge portions. The inter-submodule interconnection structures may be configured to electrically interconnect the first and second PV submodules to form an electrically interconnected PV assembly. The plurality of inter-submodule interconnection structures may be flexible conductors. Thus, the inter-submodule interconnection structures may maintain electrical interconnectivity between the first and second PV submodules even as the assembly of PV submodules is folded and unfolded.

The plurality of inter-submodule interconnection structures may each have a width, and may be separated from each other by a separation distance, measured orthogonally to the width, where the separation distance may be approximately twice the width. Such a separation may facilitate bending the assembly of PV submodules in such a way that bending of the inter-submodule interconnection structures is minimized. The inter-submodule interconnection structures interconnecting the first and second submodules may be arranged into two or more laterally spaced groups, for example as indicated in FIG. 1.

The conductive pattern formed on the top sheet may further include conductive edge bus bars configured to be disposed along the edge portions of the first and second submodules and electrically connected to the plurality of inter-submodule interconnection structures. The edge bus bars may be electrically connected to the bus bars of the inter-cell electrical connections, thereby providing electrical connection between the inter-cell electrical connections and the inter-submodule interconnection structures, as depicted in FIG. 1.

Method 100 may include a step 108 of positioning the PV cells on the flexible transparent top sheet with the first submodule on a first side of the fold line and the second submodule on a second side of the fold line. That is, the first subset of cells may be disposed on the first side of the fold line and the second subset of cells may be disposed on the second side of the fold line. The first subset of cells may be positioned to be electrically interconnected by the first plurality of inter-cell electrical connections. For example, each of the first subset of cells may be positioned so that the first polarity of each cell makes contact with a bus bar and the second polarity of each cell makes contact with an interconnection tab. Thus may the first subset of cells be electrically interconnected in series to form the first submodule.

Similarly, the second subset of cells may be positioned to be electrically interconnected by the second plurality of inter-cell electrical connections. For example, each of the second subset of cells may be positioned so that the first polarity of each cell makes contact with a bus bar and the second polarity of each cell makes contact with an interconnection tab. Thus may the second subset of cells be electrically interconnected in series to form the second submodule.

The first and second subsets of cells may be positioned to be electrically interconnected with each other by the inter-submodule interconnection structures. Specifically, the submodules may be positioned in a manner whereby the bus bars at edge portions of one submodule are electrically interconnected to the bus bars at edge portions of the adjacent submodule via the non-perpendicular inter-submodule interconnection structures. The PV submodules may be electrically interconnected to each other in series or in parallel, depending on the desired configuration of the assembly of PV submodules.

The non-perpendicular angles at which the plurality of inter-submodule electrical interconnection structures extend from the first and second submodules may be, for example, between 10 and 45 degrees. The inter-submodule interconnection structures may be parallel as the inter-submodule interconnection structures cross the fold line so that each inter-submodule interconnection structure crosses the fold line at the same non-perpendicular angle. In some cases, the common non-perpendicular angle may be between 10 and 30 degrees, for example, approximately 30 degrees. Alternatively, the inter-submodule interconnection structures need not be parallel to each other or even linear, and in some cases, a single linear or non-linear inter-submodule interconnection structure, rather than a plurality, may be used.

The PV assembly created by method 100 may be configured to fold along each fold line into a folded configuration wherein a majority of the bending along the fold line occurs in sections of the assembly where the inter-submodule interconnection structures are absent. For example, the majority of bending along the fold line may occur in the spaces between the inter-submodule interconnection structures. As described previously, in some cases the spaces may be at least twice as wide as the inter-submodule interconnection structures themselves.

Method 100 may optionally include a step of laser welding the inter-cell electrical connections to at least some of the cells. Method 100 may further optionally include a step of laser welding the inter-submodule interconnection structures to at least some of the cells, for example to edge portions of the cells. These optional steps may secure the PV cells to the top sheet and thereby improve the electrical and mechanical stability of the assembly of PV submodules.

4. Additional Description of Features

The following numbered paragraphs describe, without limitation, possible features of photovoltaic assemblies, chargers, and method of manufacturing the same, according to aspects of the present disclosure.

A. An assembly of electrically interconnected photovoltaic submodules, comprising:

a first photovoltaic submodule including a first plurality of electrically interconnected photovoltaic cells;

a second photovoltaic submodule including a second plurality of electrically interconnected photovoltaic cells, wherein the second submodule is separated from the first submodule by a fold zone characterized by a fold line; and a plurality of conductors each extending through the fold zone at a non-perpendicular angle relative to the fold line, to electrically interconnect the first and second submodules.

A1. The assembly of paragraph A, wherein each non-perpendicular angle is between 15 and 45 degrees.

A2. The assembly of paragraph A, wherein the conductors are parallel in the fold zone so that each conductor extends through the fold zone at the same non-perpendicular angle.

A3. The assembly of paragraph A2, wherein the non-perpendicular angle is between 10 and 30 degrees.

A4. The assembly of paragraph A2, wherein the conductors each have a width, and the conductors are separated from each other by a separation distance measured orthogonally to the width.

A5. The assembly of paragraph A4, wherein the separation distance is approximately twice the width.

A6. The assembly of paragraph A2, wherein the non-perpendicular angle is approximately 30 degrees.

B. A foldable photovoltaic charger, comprising:

a flexible substrate;

first and second photovoltaic submodules disposed on the substrate and separated from each other by a first fold zone, each submodule including a plurality of electrically interconnected photovoltaic cells; and a first plurality of linear conductors, each extending through the first fold zone to electrically interconnect parallel edge portions of the first and second submodules;

wherein the first plurality of conductors each extend through the first fold zone at an angle between 15 and 45 degrees relative to the edge portions of the first and second submodules.

B1. The photovoltaic charger of paragraph B, wherein the conductors are parallel to each other in the first fold zone.

B2. The photovoltaic charger of paragraph B1, wherein each conductor has a width, wherein adjacent conductors are separated from each other by a separation distance orthogonal to the width, and wherein the separation distance is at least twice the width.

B3. The photovoltaic charger of paragraph B, further comprising:

third and fourth photovoltaic submodules disposed on the substrate, separated from each other by the first fold zone and separated from the first and second photovoltaic submodules by a second fold zone;

a second plurality of linear conductors, each extending through the first fold zone to electrically interconnect parallel edge portions of the third and fourth submodules;

a third plurality of linear conductors, each extending through the second fold zone to electrically interconnect parallel edge portions of the first and third submodules; and a fourth plurality of linear conductors, each extending through the second fold zone to electrically interconnect parallel edge portions of the second and fourth submodules;

wherein all of the conductors extend through a respective one of the fold zones at an angle between 15 and 45 degrees relative to edge portions of the submodules connected by the conductors.

B4. The photovoltaic charger of paragraph B3, wherein the charger is configured to fold along the first fold zone and the second fold zone, into a folded configuration wherein a majority of the bending within each fold zone occurs in sections of the charger where the conductors are absent.

B5. The photovoltaic charger of paragraph B1, wherein each conductor has a width, wherein adjacent conductors are separated from each other by a separation distance orthogonal to the width, and wherein the separation distance is at least twice the width.

C. A foldable photovoltaic assembly, comprising:
a flexible substrate defining a rectangular grid including a plurality of submodule areas separated by fold zones;
a plurality of photovoltaic submodules each disposed on the substrate in one of the submodule areas; and
a plurality of conductors, each extending through one of the fold zones to electrically interconnect parallel edge portions of a pair of adjacent submodules;
wherein each conductor is oriented at an angle between 15 and 45 degrees relative to the edge portions of the pair of submodules interconnected by the conductor; and
wherein the photovoltaic assembly is configured to be transformed between an unfolded state in which all of the photovoltaic submodules are exposed, to a folded state in which one or fewer of the photovoltaic submodules are exposed, by folding the assembly along lines defined by the fold zones.

C1. The assembly of paragraph C, wherein a majority of bending in each fold zone occurs in sections of the substrate in which the conductors are absent, when the assembly is in the folded state.

C2. The assembly of paragraph C, wherein each pair of adjacent submodules is interconnected by a plurality of the conductors.

C3. The assembly of paragraph C2, wherein the conductors interconnecting each particular pair of adjacent submodules are oriented parallel to each other.

C4. The assembly of paragraph C3, wherein the conductors interconnecting each particular pair of adjacent submodules are arranged into two laterally spaced groups.

C5. The assembly of paragraph C3, wherein the conductors interconnecting each particular pair of adjacent submodules have a common width and are separated from each other by a separation distance at least twice the width.

C6. The assembly of paragraph C3, further comprising conductive bus bars disposed along the edge portions of each submodule and electrically connected to respective pluralities of the parallel conductors.

D. A photovoltaic assembly, comprising:
a transparent top sheet including a conductive pattern, the conductive pattern having the following features:
a first plurality of inter-cell electrical connections configured to electrically interconnect a first subset of photovoltaic cells to create a first electrically interconnected photovoltaic submodule,
a second plurality of inter-cell electrical connections configured to electrically interconnect a second subset of photovoltaic cells to create a second electrically interconnected photovoltaic submodule, and
a plurality of inter-submodule interconnection structures each extending between parallel adjacent edge portions of the first and second plurality of inter-cell electrical connections at a non-perpendicular angle relative to the edge portions, wherein the inter-submodule interconnection structures are configured to electrically interconnect the first and second photovoltaic submodules to form an electrically interconnected photovoltaic assembly;
wherein the transparent top sheet further includes a fold line oriented parallel to the adjacent edge portions of the first and second plurality of inter-cell electrical connections, and intersecting each of the inter-submodule interconnection structures.

D1. The assembly of paragraph D, further comprising a plurality of photovoltaic cells positioned on the transparent top sheet and electrically interconnected by the inter-cell electrical connections and the inter-submodule interconnection structures to form at least two interconnected photovoltaic submodules.

E1. A method of manufacturing an electrically interconnected assembly of photovoltaic submodules, the method comprising:
providing a plurality of discrete, electrically separated photovoltaic cells;
providing a transparent flexible top sheet defining a fold line;
forming a conductive pattern on the transparent flexible top sheet, wherein the conductive pattern includes:
a first plurality of inter-cell electrical connections configured to electrically interconnect a first subset of the photovoltaic cells to create a first electrically interconnected photovoltaic submodule,
a second plurality of inter-cell electrical connections configured to electrically interconnect a second subset of the photovoltaic cells to create a second electrically interconnected photovoltaic submodule, and
a plurality of inter-submodule interconnection structures each extending between parallel adjacent edge portions of the first and second submodules at a non-perpendicular angle relative to the edge portions, wherein the inter-submodule interconnection structures are configured to electrically interconnect the first and second photovoltaic submodules to form an electrically interconnected photovoltaic assembly; and
positioning the photovoltaic cells on the transparent flexible top sheet with the first subset of cells disposed on a first side of the fold line and the second subset of cells disposed on a second side of the fold line, wherein the first subset of cells are positioned to be electrically interconnected by the first plurality of inter-cell electrical connections, the second subset of cells are positioned to be electrically interconnected by the second plurality of inter-cell electrical connections, and the first and second subsets of cells are positioned to be electrically interconnected with each other by the inter-submodule interconnection structures.

E2. The method of paragraph E1, wherein each of the inter-cell electrical connections includes a bus bar and a plurality of interconnection tabs extending from the bus bar.

E3. The method of paragraph E2, further comprising laser welding the inter-cell electrical connections to at least some of the cells.

E4. The method of paragraph E3, further comprising laser welding the inter-submodule interconnection structures to at least some of the cells.

E5. The method of paragraph E1, wherein the plurality of inter-submodule interconnection structures are flexible conductors.

E6. The method of paragraph E1, wherein each non-perpendicular angle is between 15 and 45 degrees.

E7. The method of paragraph E1, wherein the inter-submodule interconnection structures are parallel as the inter-submodule interconnection structures cross the fold line so that each inter-submodule interconnection structure crosses the fold line at the same non-perpendicular angle.

E8. The method of paragraph E7, wherein the non-perpendicular angle is between 10 and 30 degrees.

E9. The method of paragraph E1, wherein the inter-submodule interconnection structures each have a width, and the inter-submodule interconnection structures are separated from each other by a separation distance measured orthogonally to the width.

E10. The method of paragraph E9, wherein the separation distance is approximately twice the width.

E11. The method of paragraph E7, wherein the non-perpendicular angle is approximately 30 degrees.

E12. The method of paragraph E1, wherein the assembly is configured to fold along the fold line into a folded configuration wherein a majority of the bending along the fold line occurs in sections of the assembly where the inter-submodule interconnection structures are absent.

E13. The method of paragraph E1, wherein the inter-submodule interconnection structures interconnecting the first and second submodules are arranged into two laterally spaced groups.

E14. The method of paragraph E1, wherein the conductive pattern includes conductive edge bus bars configured to be disposed along the edge portions of the first and second submodules and electrically connected to the plurality of inter-submodule interconnection structures.

What is claimed is:

1. An assembly of electrically interconnected photovoltaic submodules, comprising:
   a first photovoltaic submodule including a first plurality of electrically interconnected photovoltaic cells;
   a second photovoltaic submodule including a second plurality of electrically interconnected photovoltaic cells, wherein the second submodule is separated from the first submodule by a fold zone characterized by a fold line; and
   a plurality of spaced apart conductive interconnection structures electrically interconnecting the first and second submodules, each including a discrete bundle of parallel conductors and each extending through the fold zone at a non-perpendicular angle relative to the fold line;
   wherein each and every one of the conductive interconnection structures is independently sufficient to electrically interconnect the photovoltaic submodules.

2. The assembly of claim 1, wherein each non-perpendicular angle is between 15 and 45 degrees.

3. The assembly of claim 1, wherein the non-perpendicular angle is between 10 and 30 degrees.

4. The assembly of claim 1, wherein the conductors each have a width, adjacent conductors are separated from each other by a separation distance measured orthogonally to the width, and the separation distance is greater than the width.

5. The assembly of claim 4, wherein the separation distance is approximately twice the width.

6. The assembly of claim 1, wherein the non-perpendicular angle is approximately 30 degrees.

7. The assembly of claim 1 comprising a substrate underlying the photovoltaic submodules, wherein the assembly is configured to fold along the fold line into a folded configuration wherein a majority of bending within the fold zone occurs in sections of the substrate where the conductors are absent.

8. A foldable photovoltaic charger, comprising:
   a flexible substrate;
   first, second, third, and fourth photovoltaic submodules disposed on the substrate each submodule including a plurality of electrically interconnected photovoltaic cells;
   a first fold zone separating the first and third submodules from the second and fourth submodules;
   a second fold zone oriented transverse to the first fold zone and separating the first and second submodules from the third and fourth submodules; and
   a plurality of conductive interconnection structures, each including a bundle of linear conductors, each interconnection structure extending linearly through at least one of the first and second fold zones to directly electrically interconnect parallel edge portions of adjacent ones of the submodules, such that each submodule is directly electrically interconnected with at least two adjacent submodules.

9. The photovoltaic charger of claim 8, wherein the conductive interconnection structures are parallel to each other in the first fold zone.

10. The photovoltaic charger of claim 9, wherein each conductor has a width, wherein adjacent conductors are separated from each other by a separation distance orthogonal to the width, and wherein the separation distance is at least twice the width.

11. The photovoltaic charger of claim 8, wherein the charger is configured to fold along the first fold zone and the second fold zone, into a folded configuration wherein a majority of bending within each fold zone occurs in sections of the charger where the conductors are absent.

12. The photovoltaic charger of claim 11, wherein each conductor has a width, wherein adjacent conductors are separated from each other by a separation distance orthogonal to the width, and wherein the separation distance is at least twice the width.

13. The photovoltaic charger of claim 8, wherein the first conductive interconnection structure extends linearly through the first fold zone at an angle between 15 and 45 degrees relative to the edge portions of the first and second submodules.

14. A foldable photovoltaic assembly, comprising:
   a flexible substrate defining a rectangular grid including a plurality of submodule areas separated by fold zones, wherein a first one of the fold zones is oriented transverse to a second one of the fold zones;
   a plurality of photovoltaic submodules each disposed on the substrate in one of the submodule areas, such that adjacent pairs of the submodules are separated by respective fold zones; and
   a plurality of conductive interconnection structures, each including a bundle of linear conductors, each extending through one of the fold zones to electrically interconnect parallel edge portions of one of the pairs of adjacent submodules;
   wherein the photovoltaic assembly is configured to be transformed between an unfolded state in which all of the photovoltaic submodules are exposed, and a folded state in which one or fewer of the photovoltaic submodules are exposed, by folding the assembly along lines defined by the fold zones;
   wherein each photovoltaic submodule is directly electrically interconnected with at least two other submodules; and
   wherein each conductor is oriented at an angle between 15 and 45 degrees relative to the edge portions of the pair of submodules interconnected by the conductor, such that a majority of bending in each fold zone occurs in sections of the substrate in which the conductors are absent, when the assembly is in the folded state.

15. The assembly of claim 14, wherein each pair of adjacent submodules is interconnected by at least two of the conductors.

16. The assembly of claim 15, wherein the conductors interconnecting each particular pair of adjacent submodules are oriented parallel to each other.

17. The assembly of claim 16, wherein the conductors interconnecting each particular pair of adjacent submodules are arranged into two laterally spaced groups.

18. The assembly of claim 16, wherein the conductors interconnecting each particular pair of adjacent submodules have a common width and are separated from each other by a separation distance at least twice the width.

19. The assembly of claim 16, further comprising conductive bus bars disposed along the edge portions of each submodule and electrically connected to respective pluralities of the parallel conductors.

* * * * *